(12) United States Patent  
Cohen Bengio

(10) Patent No.: US 8,531,464 B1
(45) Date of Patent: Sep. 10, 2013

(54) SIMULATING SKIN DEFORMATION RELATIVE TO A MUSCLE

(75) Inventor: Julien F. Cohen Bengio, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 379 days.

(21) Appl. No.: 12/900,320

(22) Filed: Oct. 7, 2010

(51) Int. Cl.
*G06T 13/00* (2011.01)

(52) U.S. Cl.
USPC .............................. 345/473; 345/419; 345/629

(58) Field of Classification Search
None
See application file for complete search history.

(56) References Cited

U.S. PATENT DOCUMENTS

| | | | |
|---|---|---|---|
| 7,646,383 B1* | 1/2010 | Taylor | 345/473 |
| 2004/0095352 A1* | 5/2004 | Huang | 345/473 |

OTHER PUBLICATIONS

Shipkov, "Muscles 4.1", (2010) downloaded from the internet at: http://petershipkov.com/development/muscles/muscles.htm on Jun. 27, 2011, 10 pages.

* cited by examiner

*Primary Examiner* — Said Broome
(74) *Attorney, Agent, or Firm* — Kilpatrick Townsend & Stockton LLP

(57) ABSTRACT

Methods, systems, and apparatus, including computer programs encoded on a computer storage medium, are disclosed for animations that simulate skin deformation relative to a muscle. Displacement of a skin representation in response to deformation of a muscle representation and sliding of the skin representation over the deformed muscle representation can be determined quickly and interactively by monitoring changes in position and scale of defining ring elements of the muscle representation's geometry. The determined skin displacements can be constrained to prevent portions of the displaced skin representation from sinking into the underlying muscle representation's geometry.

27 Claims, 10 Drawing Sheets

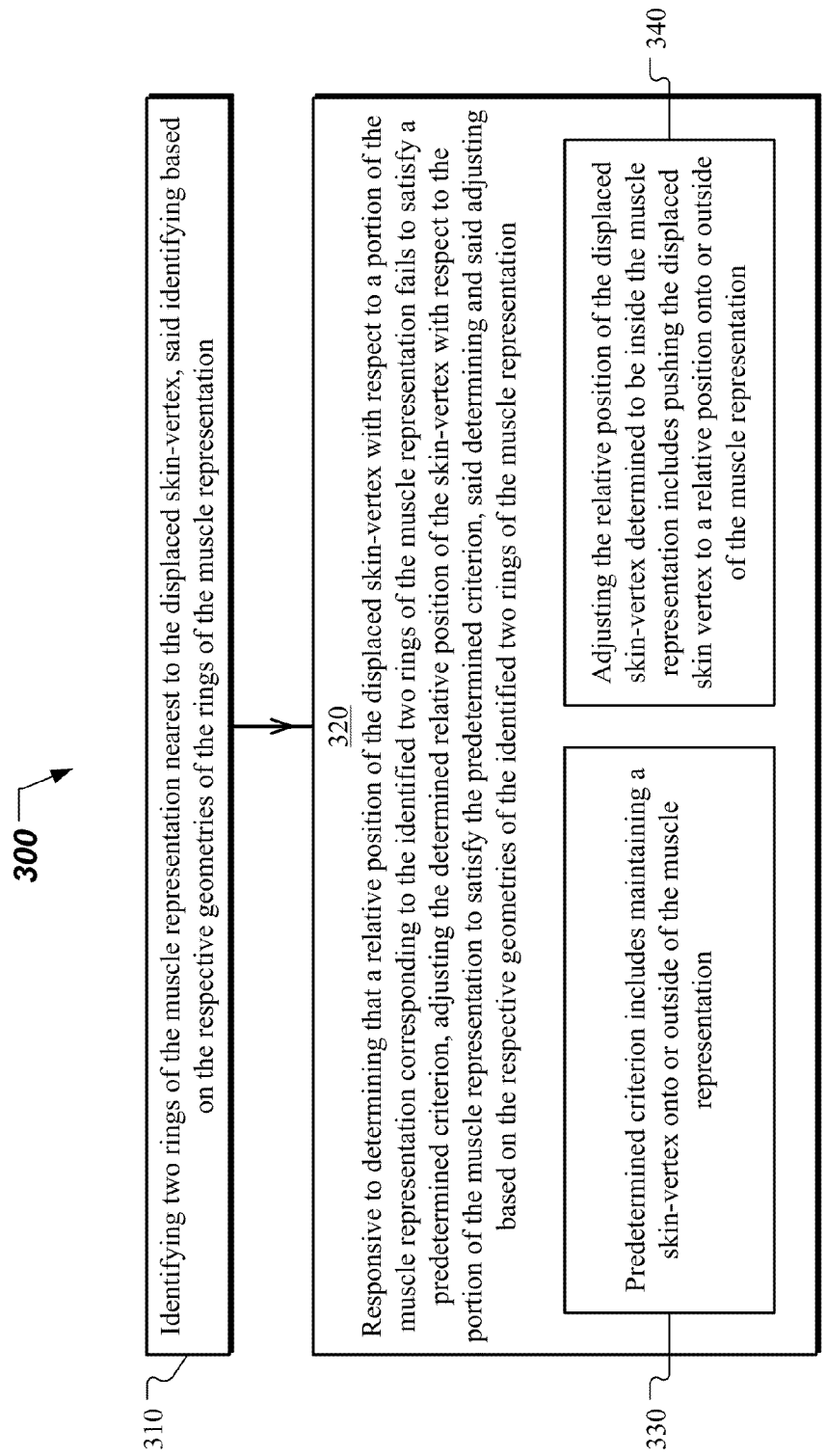

SIMULATING SKIN DEFORMATION RELATIVE TO A MUSCLE

BACKGROUND

This specification relates in general to simulating skin deformation relative to a muscle, for example, simulating sliding of a skin representation over a muscle representation.

Projects that rely on generating animations, such as the development of online applications (e.g., video game titles) and/or off-line applications (e.g., animated film productions), may call for a significant number of animations with varying levels of details. For example, animated characters located in the foreground of a particular scene may require a significant amount of detail to appear realistic and hold the attention of a casual viewer, whereas animated characters or other objects in the background typically can include less detail while still maintaining an appropriate level of realism.

To enhance the realism of a character's appearance, a skin representation can be overlapped over the character's bone structure such that the skin representation can move and bend along with, but independently of, the character's limbs, torso, and the like. To help ensure that the skin representation deforms realistically when the bones are moved, bones of the character's skeleton can be assigned corresponding "influence volumes"—that is, defined portions of the skin representation that move with the respective bones.

To further enhance the realistic aspect of the character's appearance, a muscle representation can be added to the character's skeleton, and the skin representation can be configured to move and deform in response to movement and deformation of the underlying muscle representation's geometry. For example, flexing a bicep muscle representation would deform a portion of the skin representation to conform to the shape of the bulged bicep muscle representation.

SUMMARY

This specification describes technologies relating to animations that simulate skin deformation relative to a muscle. Displacement of a skin representation in response to deformation of a muscle representation and sliding of the skin representation over the deformed muscle representation can be determined quickly and interactively by monitoring changes in position and scale of defining ring elements of the muscle representation's geometry. The determined skin displacements can be constrained to prevent portions of the displaced skin representation from sinking into the underlying muscle representation's geometry.

In general, an aspect of the subject matter described in this specification can be implemented in methods that include the actions of deforming a skin representation relative to a muscle representation in response to simulated motion of the muscle representation. The skin representation includes a plurality of skin-vertices. The simulated muscle representation motion is determined by controlling respective geometries of rings of the muscle representation in accordance with first motion-rules. For each of a portion of the skin representation skin-vertices, the methods include displacing the skin-vertex by controlling respective geometries of two or more selected rings of the muscle representation in accordance with second motion-rules.

Implementations can optionally include one or more of the following features. The geometry of a muscle representation ring can include location, orientation and scale of the muscle representation ring. The muscle representation includes a plurality of muscle-vertices that is independent of the skin representation skin-vertices. In some implementations, the first motion-rules can include rules for moving a vertex of the muscle representation by controlling respective geometries of selected rings of the muscle representation, and rules for selecting the rings of the muscle representation that contribute to moving the vertex of the muscle representation. In some implementations, the second motion-rules can include rules for moving a skin-vertex of the skin representation by controlling respective geometries of the two or more selected rings of the muscle representation, and rules for selecting the two or more rings of the muscle representation that contribute to moving the skin-vertex of the skin representation.

The methods can further include identifying two rings of the muscle representation adjacent to the displaced skin-vertex, such that the identifying is based on the respective geometries of the rings of the muscle representation. Responsive to determining that a relative position of the displaced skin-vertex with respect to a portion of the muscle representation corresponding to the identified two rings of the muscle representation fails to satisfy a predetermined criterion, the methods include adjusting the determined relative position of the skin-vertex with respect to the portion of the muscle representation to satisfy the predetermined criterion. The determining and the adjusting are based on the respective geometries of the identified two rings of the muscle representation. The predetermined criterion can include maintaining a skin-vertex onto or outside of the muscle representation.

In some implementations, maintaining the skin-vertex outside of the muscle representation can include maintaining a skin-vertex outside of a volume of a prism including the identified rings of the muscle representation. In some implementations, maintaining the skin-vertex outside of the muscle representation includes maintaining a predetermined distance from a lateral surface of a prism including the identified rings of the muscle representation. Adjusting the relative position of the displaced skin-vertex determined to be inside the muscle representation can include pushing the displaced skin vertex to a relative position onto or outside of the muscle representation. In some implementations, identifying the two rings of the muscle representation adjacent to the displaced skin-vertex can include, for each ring of the muscle representation, calculating a scalar product between a normal to a center of the ring and a vector drawn from the displaced skin-vertex to the center of the ring, and selecting two consecutive rings for which the respective scalar products have opposite signs as the two rings of the muscle representation adjacent to the displaced skin-vertex.

In some implementations, determining the relative position of the displaced skin-vertex with respect to the portion of the muscle representation corresponding to the identified two rings of the muscle representation can include determining a first intersection point of a first plane—defined by the displaced skin-vertex and centers of the identified two rings adjacent to the displaced skin-vertex—with a first ring of the identified two rings adjacent to the displaced skin-vertex; determining a second intersection point of the first plane with a second ring of the identified two rings adjacent to the displaced skin-vertex; determining a projection point of the displaced skin-vertex onto a line including centers of the identified two rings adjacent to the displaced skin-vertex; determining a third intersection point of a line including the displaced skin-vertex and the projection point with a line including the first and second intersection points; determining the relative position of the displaced skin-vertex to be outside of the portion of the muscle representation when the third intersection point is between the displaced skin-vertex and the projection point; determining the relative position of the displaced skin-vertex to be on a lateral surface of the portion of the muscle representation when the third intersection point coincides with the displaced skin-vertex; and determining the relative position of the displaced skin-vertex to be inside the portion of the muscle representation when the displaced skin-vertex is between the third intersection point and the projection point.

The subject matter described in this specification can be implemented as a method or as a system or using computer program products, tangibly embodied in information carriers, such as a CD-ROM, a DVD-ROM, a HD-DVD-ROM, a Blue-Ray drive, a semiconductor memory, and a hard disk. Such computer program products may cause a data processing apparatus to conduct one or more operations described in this specification. In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

Particular implementations of the subject matter described in this specification can be configured so as to realize one or more of the following potential advantages. The techniques described in this specification can determine the relative motion of a skin representation from geometry changes of a muscle representation's rings, in contrast to other skinning algorithms that determine skin deformations based on motion of muscle-vertices. Additionally, the disclosed techniques use the geometry of the muscle representation's rings to determine whether a displaced skin-vertex is within or outside of the muscle representation, in contrast to skin relaxation algorithms that perform such determination based on identifying muscle-vertices nearest to the displaced skin-vertex. Because the number of the muscle representation's rings is independent of how complex a wireframe of muscle-vertices associated with the muscle representation is, the computing resources used for performing the foregoing determination can be independent of the complexity of the wireframe of muscle-vertices associated with the muscle representation.

Because the methods disclosed in this specification include moving portions of a character's skin in response to motion of and relative to rings of a muscle representation, the accuracy of modeling skin displacements based on the disclosed techniques can potentially be greater than a modeling accuracy corresponding to other skinning algorithms based, for example, on displacing portions of a character model's skin in response to motion of and with respect to limb joints of the character. In general, the number of rings of the muscle representation that control the displacement of the skin representation can be larger than the number of limb joints that control the displacement of a character's skin for the other skinning algorithms. Therefore, the accuracy of the skin displacement simulations can increase for the disclosed methods over the other skinning algorithms, which can in turn lead to a potentially improved viewing experience of the character's animation.

Additionally, the techniques disclosed in this specification can be implemented as a real-time skin adjustment technique since the skin-sliding effect can be obtained in one step of pushing skin-vertices that are displaced within the muscle to the surface of the muscle. In contrast, some skin relaxation algorithms often require that multiple iterations be performed for sliding a skin representation over the deforming muscle representation.

In addition, an animator using the disclosed techniques can see the results of the skin deformation simulations interactively as the character is moving, in contrast with simulations based on skin relaxation which may require a long computation time before the animator could visualize the skin displacements. The interactive aspect of the techniques disclosed in this specification allows the animator to perform quick tweaking of the animation and of the look of the deformation without having to wait for the skin relaxation to be calculated.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

FIGS. 3A-3D show aspects of a method for adjusting deformation of a skin representation.

Like reference numbers and designations in the various drawings indicate like elements.

DETAILED DESCRIPTION

The systems and techniques described in this specification can be implemented as part of production flow by a model producer for attaching skin to the muscles of a character model, for instance. The produced character model can be used by a model animator to manipulate the character model. For example during animation, the animator can move the limbs of the character model. The disclosed techniques can be implemented to specify how to displace/deform the character model's skin in response to the movement/deformation of the character model's muscles. More generally, the techniques and systems described in this specification can be implemented for displacing a first geometry in response to (and relative to) a second geometry that is being deformed.

Figure 1A:
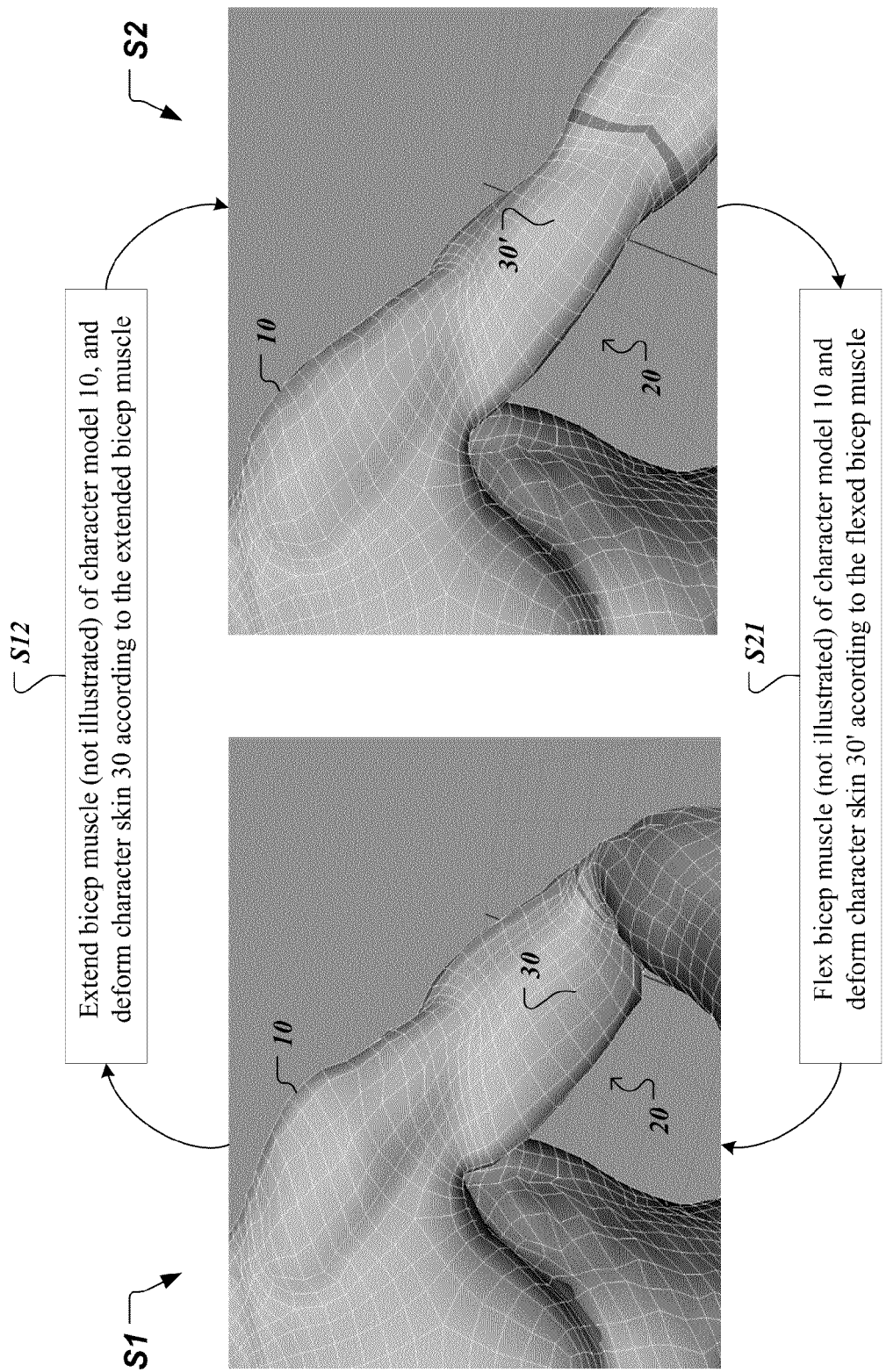
FIG. 1A shows an aspect of a procedure for deforming a skin representation of a character model.

FIG. 1A shows an aspect of a procedure for deforming a skin representation of a character model. A character model 10 includes a representation of an arm 20, i.e., a region of the character model 10 between shoulder and elbow. The character's arm representation 20 includes muscles, e.g., the bicep, the triceps, the deltoid, and the like. While not illustrated in FIG. 1A, muscle representations are depicted below in FIGS. 1B, 2B and 4A, for instance. Further, the arm muscles can be covered by a skin representation 30 that includes a plurality of skin-vertices. For example, the skin-representation 30 can be depicted as a white mesh of skin-vertices. In FIG. 1A, the example mesh of skin-vertices 30 has a teal background.

State S1 of the character 10's arm representation 20 is characterized by a flexed bicep muscle. While the character 10's arm representation 20 is in the state S1, the skin-vertices of the skin representation 30 are shaped in accordance with the shape of the flexed bicep muscle. The character 10's arm representation 20 can transition from the state S1 to another state S2 upon extending the bicep muscle from its flexed instance (S12). Further, the state S2 of the character 10's arm representation 20 is characterized by an extended bicep muscle. While the character 10's arm representation 20 is in the state S2, the skin-vertices 30' are shaped in accordance with the shape of the extended bicep muscle. The character's arm representation 20 can transition from the state S2 back into the state S1 upon flexing the bicep muscle from its extended instance (S21).

For example, the shape of the skin-vertices 30 corresponding to the flexed instance of the bicep muscle in the state S1 can be described as a deformation relative to a shape of the skin-vertices 30* corresponding to a rest (un-deformed) instance of the bicep muscle. As another example, the shape of the skin-vertices 30 corresponding to the flexed instance of the bicep muscle in the state S1 can be described as a deformation relative to the shape of the skin-vertices 30' corresponding to the extended instance of the bicep muscle in the state S2. Similarly, the shape of the skin-vertices 30' corresponding to the extended instance of the bicep muscle in the state S2 can be described as a deformation relative to a shape of the skin-vertices 30* corresponding to a rest (un-deformed) instance of the bicep muscle. As another example, the shape of the skin-vertices 30 corresponding to the extended instance of the bicep muscle in the state S2 can be described as a deformation relative to the shape of the skin-vertices 30 corresponding to the flexed instance of the bicep muscle in the state S1.

Figure 1B:
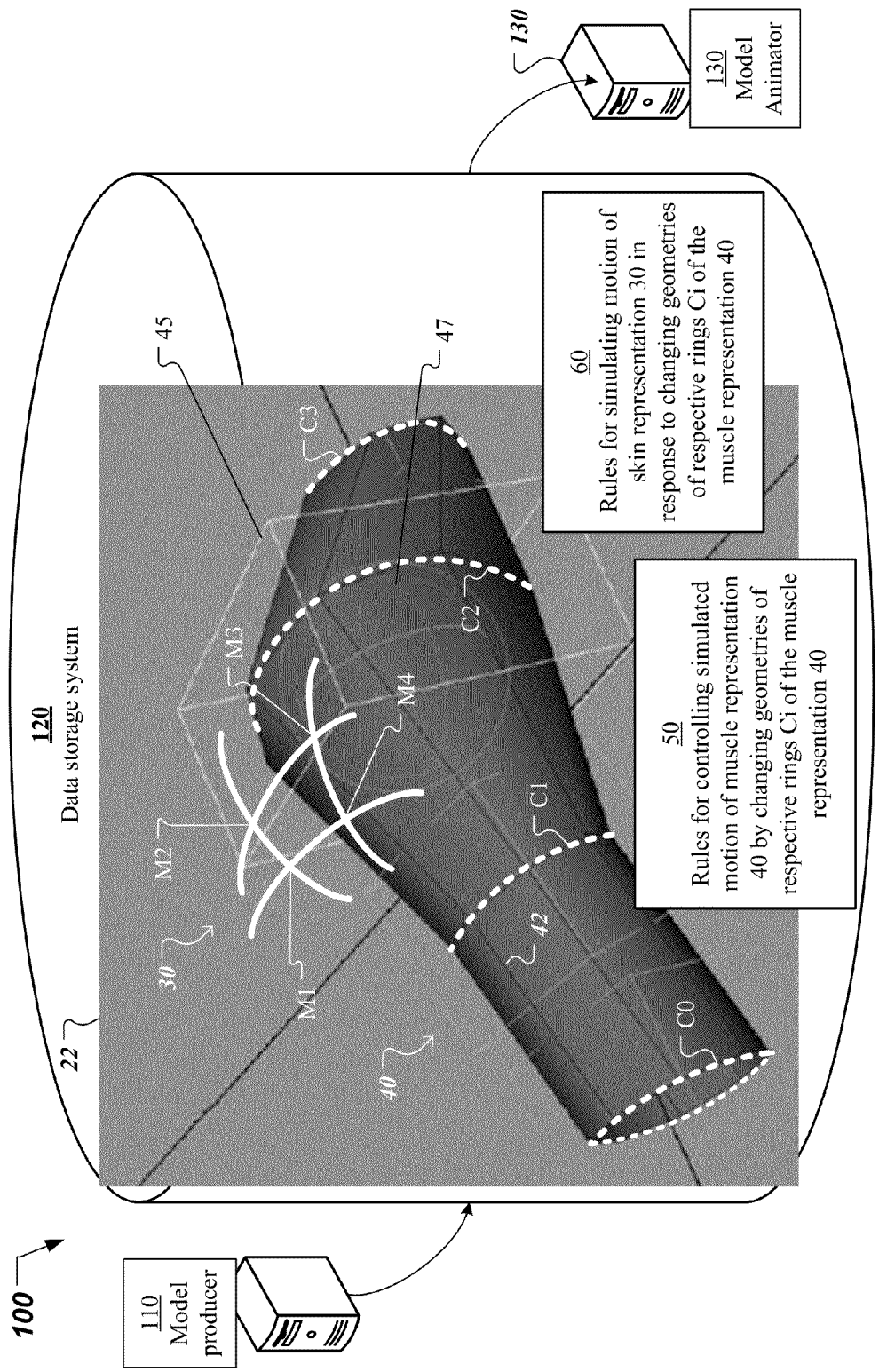
FIG. 1B shows an example of a system for deforming a skin representation in response to motion of a muscle representation.

FIG. 1B shows an example of a system 100 for deforming a skin representation in response to motion of an underlying muscle representation. In the example illustrated in FIG. 1A, the character model 10's skin representation 30, 30' is depicted using a white wireframe of skin vertices. An example of a muscle representation 40 is described in detail below. System 100 includes a model producer system 110 communicatively coupled with a data storage system 120. A data processor of the model producer system 110 is configured to generate and to store the generated character model. For example, portions of the character model, such as a portion of an arm representation 22, can be stored on the data storage system 120. In addition, the data processor of the model producer system 110 is configured to store rules 50, 60 for controlling motion of various components of the stored portion of the arm representation 22. The arm representation 22's components and the motion rules 50, 60 are disclosed in detail below. Further, system 100 includes a model animator system 130 communicatively coupled with the data storage system 120. A data processor of the model animator system 130 is configured to request, from the data storage system 120, information related with the stored arm representation 22 and the motion rules 50, 60. In some implementations, the data storage system 120 can be part of the model producer system 110. In some other implementations, the data storage system 120 can be part of the model animator system 130. In some further implementations, the model producer system 110 can be integrated with the model animator system 130. In some implementations, the model producer system 110 and the model animator system 130 can be integrated together and with the data storage system 120.

The portion of the arm representation 22 includes a muscle representation 40 and a skin representation 30. As described above in connection with FIG. 1A, the skin representation 30 is depicted as a wireframe (white lines) including a plurality of skin-vertices M1, M2, M3, M4, . . . ; Additionally in the example illustrated in FIG. 1A, the muscle representation 40 can correspond to at least one muscle of the character model 10's arm representation 20. For instance, the muscle representation 40 can correspond to the bicep muscle of the character model 10's arm representation 20.

The muscle representation 40 can include rings Ci, i=0, 1, 2, . . . , and a wireframe of muscle-vertices 42. In some implementations, the wireframe of muscle-vertices 42 can be independent of the wireframe of skin-vertices 30. In FIG. 1B, the exemplary wireframe of skin-vertices 30 has a clear background, while the exemplary wireframe of muscle-vertices 42 has a grey background.

The rings Ci, depicted in FIG. 1B with dashed-line, represent cross-sections of the muscle representation 40 and are associated with controlling elements 45, 47 of the muscle representation 40. The controlling elements 45, 47 can be used to position, orient, and size the respective rings Ci. Further, the rings Ci have centers Oi, respectively, i=0, 1, 2, . . . , and can be shaped as ellipses. A shape of an ellipse Ci has a scale (ai, bi), given in terms of the ellipse Ci's short-axis "ai" and long-axis 'bi'', respectively. A location of a ring Ci corresponds to the center of the ring Oi. An orientation of the ring Ci corresponds to a normal "$n_i$" to a plane of the ring Ci. A direction of the normal "$n_i$" of the ring Ci is such that a scalar product $n_i*n_{i+1}$ between normals of consecutive rings $C_i$ and $C_{i+1}$ is positive. Because a geometry of ring Ci includes the ring Ci's position, orientation and scale, the muscle 40's placement and volume can be controlled by changing respective geometries of the rings Ci.

In some implementations, a ring Ci's geometry can be expressed mathematically in terms of four-dimensional (4D) state vector corresponding to the ring Ci's position, orientation and scale. Moreover, transition operators expressed in terms of 4×4 matrices can be applied to the 4D state vectors of the rings to modify/control the rings' geometries. Such transition operators can be rotations, translations, scale-transformations, and the like, and combinations thereof. For example, a 4×4 matrix operator can be applied to a first 4D state vector of a ring Ci, which corresponds to a first geometry of the ring Ci, to obtain a second 4D state vector of the ring Ci, which corresponds to a second geometry of the ring Ci. In this fashion, modifying the ring Ci's state vector by applying the appropriate 4×4 matrix operators can simulate a desired change of the ring Ci's geometry.

In addition to storing portions of character models, such as the portion of the arm representation 22, the data storage system 120 stores rules 50 (also referred to as first motion-rules) for controlling simulated motion of the muscle representation 40 by changing geometries of select rings Cj. For example, the first motion-rules 50 can include rules for moving a vertex 42-$k$ from among the muscle-vertices 42 of the muscle representation 40 in a specific manner by controlling respective geometries of select rings Cj of the muscle representation 40. As another example, the first motion-rules 50 further include rules for selecting the rings Cj of the muscle representation 40 that contribute to moving the vertex 42-$k$ of the muscle representation 40. In general, rings Cj which are adjacent to the vertex 42-$k$ can have a stronger influence on displacing the vertex 42-$k$ than rings Cj' which are not adjacent to the vertex 42-$k$. Two rings $C_1$ and $C_2$ are adjacent to a vertex "V" if there are no intervening rings of the muscle representation 40 between the vertex "V" and each of the adjacent rings $C_1$ and $C_2$. Under some circumstances, rings Cj' positioned beyond the adjacent rings Cj can be selected to contribute to moving the vertex 42-$k$ (along with the adjacent rings Cj.)

As yet another example, a rule from among the first motion rules 50 requires that respective geometries of the rings Ci change such that the volume of the muscle representation 40 remains substantially constant. Therefore, for rings of the muscle representation 40 which are being moved apart from each other, respective scales of the rings are configured to decrease correspondingly (i.e., the muscle thins as it stretches), while for rings of the muscle representation 40 which are being moved nearer to each other, respective scales of the rings are configured to increase correspondingly (i.e., the muscle bulges as it compresses).

In addition to storing the first motion-rules 50, the data storage system 120 also stores rules 60 (also referred to as second motion-rules) for simulating motion of the skin representation 30 in response to geometry changes of select rings Cm of the muscle representation 40. For example, the second motion-rules 60 include rules for displacing a skin-vertex Mp of the skin representation 30 when respective geometries of two or more select rings Cm of the muscle representation 40 are being changed to control a simulated motion of the muscle representation 40. As another example, the second motion-rules 60 include rules for selecting the two or more rings Cm of the muscle representation 40 that contribute to displacing the skin-vertex Mp of the skin representation 30.

In some implementations, two rings C1 and C2 can determine in equal proportions, e.g. of 50%, the displacements of a skin-vertex Mp located midway between the two rings C1 and C2. For instance, when the two rings C1 and C2 of the muscle representation 40 are translated by a given distance in the same direction, a rule among the second motion-rules 60 can prescribe that the skin-vertex Mp translates by the same given distance in the same direction as the rings C1 and C2. In another instance, when the two rings C1 and C2 of the muscle representation 40 are translated by a given distance in opposite directions, another rule among the second motion-rules 60 can prescribe that the skin-vertex Mp remains unmoved.

In some other implementations, the second motion-rules 60 include rules for assigning a weight of influence for the rings Ci of the muscle representation 40 based on a distance from a first skin-vertex M1 to the weighted rings Ci. Accordingly, the first skin-vertex M1 can move relative to the muscle representation 40 in response to movement of the rings Ci that can influence the motion of the first skin-vertex M1 based on weights associated with the respective rings Ci. Once the displacement of the first skin-vertex M1 is determined as described above, displacements of a second skin-vertex M2, and a third skin-vertex M3, and so on, can be determined in a similar manner.

Figure 2A:
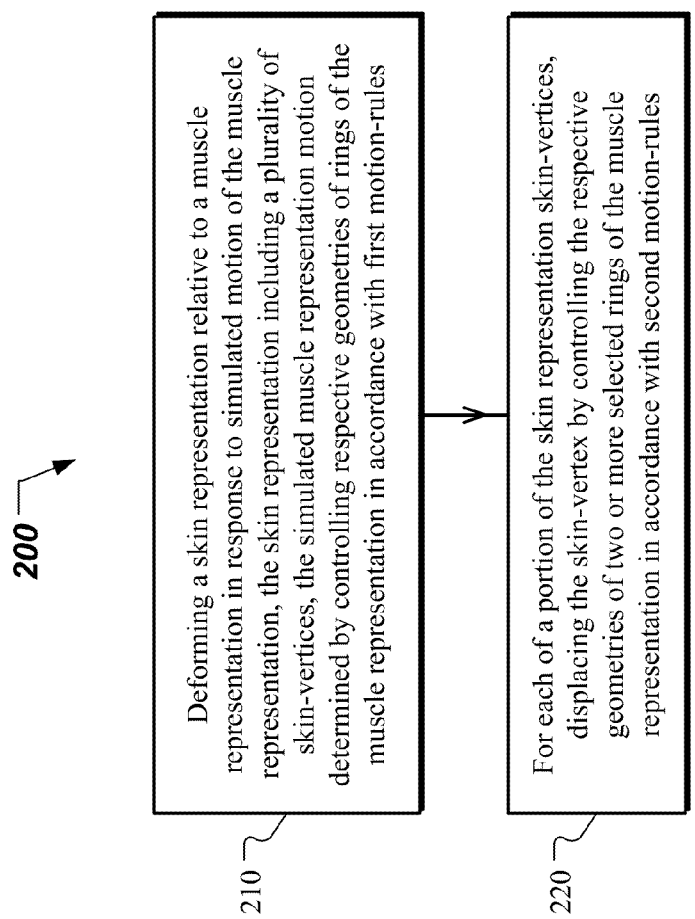
FIG. 2A shows an example of a method for deforming a skin representation in response to motion of a muscle representation.

FIG. 2A shows an example of a method 200 for deforming a skin representation in response to motion of a muscle representation. In the example described in FIG. 1A, method 200 can be implemented to flex/extend the bicep muscle of the character 10's arm representation 20 and to deform the character 10's skin representation 30, 30' in accordance to the muscle flexing/extending. In the example illustrated in FIG. 1B, method 200 can be implemented in system 100 for deforming the skin representation 30 in response to motion of the muscle representation 40.

Method 200 includes deforming 210 a skin representation relative to a muscle representation in response to simulated motion of the muscle representation. Referring to FIG. 1B, the skin representation 30 includes a plurality of skin-vertices M1, M2, . . . ; The simulated motion of the muscle representation 40 can be determined by controlling respective geometries of rings Ci of the muscle representation 40 in accordance with first motion-rules 50. The first motion-rules 50, described in detail above in connection with FIG. 1B, are provided for controlling the simulated motion of the muscle representation 40 by changing geometries of respective rings Ci. A geometry of a given ring Ck of the muscle representation 40 includes location, orientation and scale of the given ring Ck.

Further, method 200 can be applied for a portion of the skin representation skin-vertices and includes displacing 220 the skin-vertex by controlling respective geometries of two or more selected rings of the muscle representation in accordance with second motion-rules. Referring to FIG. 1B, the second motion-rules 60 are provided for simulating motion of the skin representation 30 in response to geometry changes of select rings Cm of the muscle representation 40 that occur when controlling the simulated motion of the muscle representation 40.

In contrast to the method 200, other techniques for deforming the skin representation 30 are based on movement of the underlying muscle-vertices 42. For such other techniques, the computing resources required for simulating the skin deformation can be proportional to the complexity of the wireframe of muscle-vertices 42, because there may be a large number of muscle-vertices 42 that can influence displacement of each skin-vertex M. Note, however, that for method 200, the displacement/deformation of the individual skin-vertices M1, M2, . . . of the skin representation 30 can be determined in a manner that is independent of the complexity of the underlying muscle 40's wireframe of muscle-vertices 42. The foregoing can be accomplished because, for method 200, the relative motion of the skin representation 30 is determined by changes in the geometry of the muscle 40's rings Ci, and the number of the muscle 40's rings Ci is independent of how complex the muscle 30's wireframe of muscle-vertices 42 is. Accordingly, the computing resources used to implement the method 200 for determining the relative displacement of the skin representation 30 in response to (and relative to) the deformed muscle representation 30 (which includes a wireframe of muscle-vertices 42 and rings Ci) can have a weaker dependence on the complexity of the wireframe of muscle-vertices 42 associated with the muscle representation 40 compared to the other techniques for deforming the skin representation 30 based on movement of the underlying muscle-vertices 42.

Because the second motion-rules 60 disclosed in this specification include displacing portions of the character's skin 30 in response to geometry changes of and relative to rings Ci of the muscle 40, the accuracy of modeling skin displacements can potentially increase compared to other skinning techniques. For example, such other skinning techniques are configured to displace portions of a character model's skin in response to motion of and with respect to joints of the character. However, the number of rings Ci of the muscle representation 40 that control the displacement of skin representation 30 can be larger than the number of limb joints that control the displacement of a character's skin for the other skinning techniques. Therefore, the accuracy of the skin displacement simulations can increase for the method 200 over the accuracy of the other skinning techniques, and can lead to a potentially improved viewing experience of the character's animation.

Figure 2B:
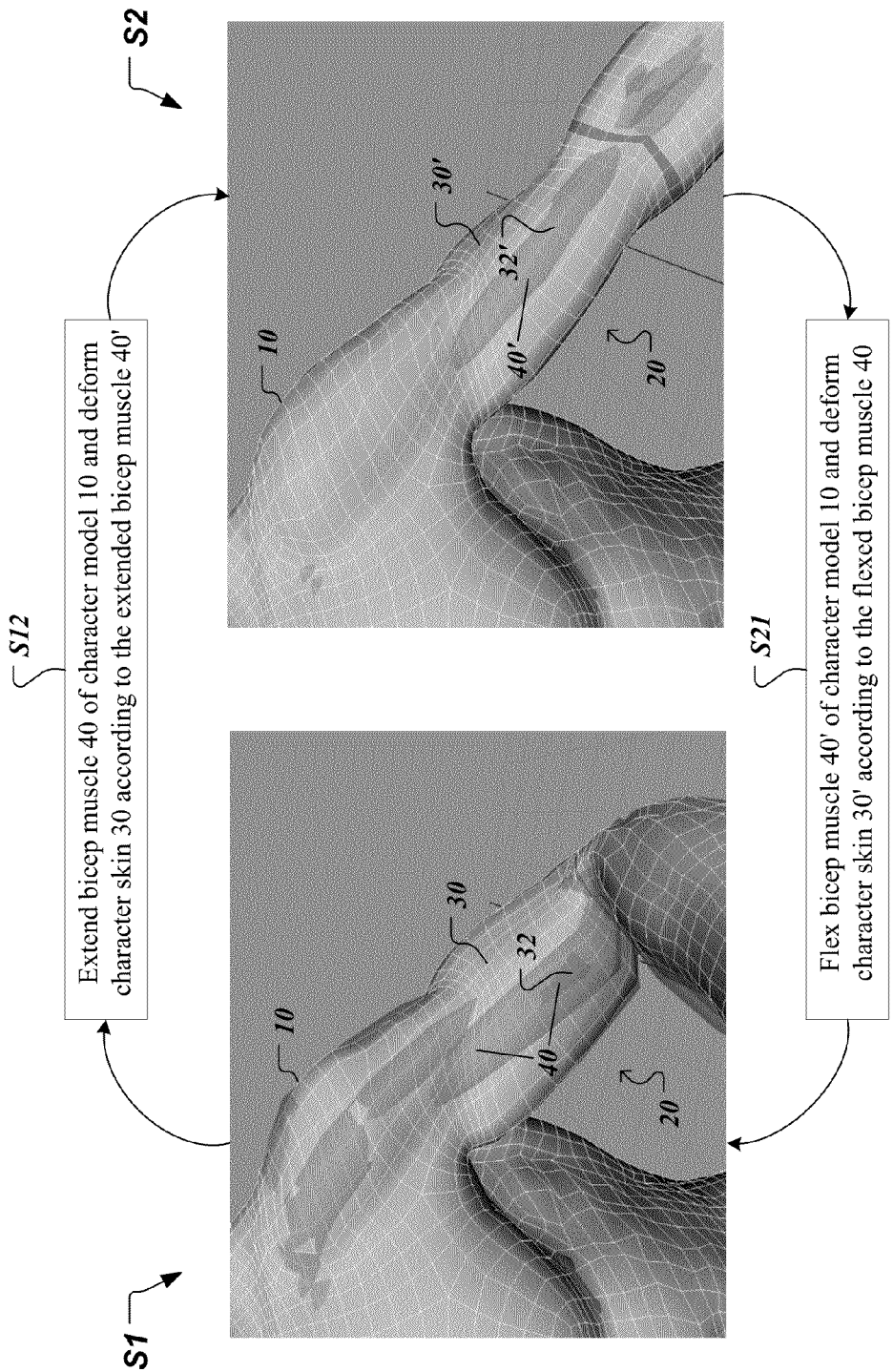
FIG. 2B shows another aspect of the procedure for deforming the skin representation of the character model.

FIG. 2B shows another aspect of the procedure illustrated in FIG. 1A for deforming the skin representation of the character model. In some implementations, the procedure illustrated in FIG. 1A can be combined with method 200 and can be implemented, for example, by the model animator system 130 shown in FIG. 1B.

As described above in connection with FIG. 1A, the character 10's arm representation 20 includes muscles, e.g., the bicep, the triceps, the deltoid, and the like. FIG. 2B shows a representation of the bicep muscle 40 depicted in grey. The bicep representation 40 is partially covered by the skin representation 30. The skin-representation 30 is depicted as a white mesh of skin-vertices on a teal background. In analogy with the description of FIG. 1A, the state S1 of the character 10's arm representation 20 corresponds to a flexed bicep muscle 40. While the character 10's arm representation 20 is in the state S1, the skin-vertices of the skin representation 30 are shaped in accordance with the shape of the flexed bicep muscle 40. The character 10's arm representation 20 can transition from the state S1 to another state S2 upon extending the bicep muscle 40 from its flexed instance (S12). In response to the extension of the bicep muscle 40', the skin representation 30 deforms in accordance with the method 200. Additionally, state S2 of the character's arm representation 20 corresponds to an extended bicep muscle 40'. While the character 10's arm representation 20 is in the state S2, the skin-vertices 30' are shaped in accordance with the shape of the extended bicep muscle 40'. The character 10's arm representation 20 can transition from state the state S2 back into the state S1 upon flexing the bicep muscle 40' from its extended instance (S21). In response to the flexion of the bicep muscle 40, the skin representation 30' deforms in accordance with the method.

Further in analogy with the description of FIG. 1A, the shape of the skin-vertices 30 corresponding to the flexed instance of the bicep muscle 40 in the state S1 can be represented as a deformation relative to a shape of the skin-vertices 30* corresponding to a rest (un-deformed) instance of the bicep muscle 40*. In addition, the shape of the skin-vertices 30 corresponding to the flexed instance of the bicep muscle 40 in the state S1 can be represented as a deformation relative to the shape of the skin-vertices 30' corresponding to the extended instance of the bicep muscle 40' in the state S2. Similarly, the shape of the skin-vertices 30' corresponding to the extended instance of the bicep muscle 40' in the state S2 can be represented as a deformation relative to a shape of the skin-vertices 30* corresponding to a rest (un-deformed) instance of the bicep muscle 40*. As another example, the shape of the skin-vertices 30 corresponding to the extended instance of the bicep muscle 40' in the state S2 can be represented as a deformation relative to the shape of the skin-vertices 30 corresponding to the flexed instance of the bicep muscle 40 in the state S1.

Note that while the character 10's arm representation 20 is in the state S1, the flexed bicep muscle 40 appears to protrude through the skin representation 30. Equivalently, a portion 32 of the skin representation 30's skin-vertices have been displaced in response to flexing of the bicep muscle representation 40 to locations that appear to be inside the volume of the bicep muscle representation 40. Further note that while the character 10's arm representation 20 is in the state S2, the extended bicep muscle 40' appears to protrude through the skin representation 30'. Equivalently, a portion 32' of the skin representation 30's skin-vertices have been displaced in response to extending of the bicep muscle representation 40' to locations that appear to be inside the volume of the bicep muscle representation 40'. A magnitude of the relative recession 32, 32' of the skin representation 30, 30' with respect to the bicep muscle representation 40, 40' (or relative protrusion of the bicep 40, 40' with respect to the skin 30, 30') can be depicted using a grey-scale, with dark hues of grey representing deep skin-recessions 32 (or high muscle-protrusions,) and light hues of grey representing shallow skin-recessions 32' (or gentle muscle-protrusions.)

An example situation when skin-vertices 32 may sink inside a volume of the bicep muscle 40 in response to changes of geometries of the bicep muscle 40's underlying rings (induced for controlling deformation of the bicep muscle 40) is described above in connection with FIG. 1B. The rules 60 for displacing portions of the character 10's skin 30 in response to changes in the geometry of and relative to rings of the bicep muscle 40 specify that two rings C1 and C2 can determine in equal proportions, e.g. of 50%, displacements of a skin-vertex Mp located midway between the two rings C1 and C2. Further, the second motion-rules 60 can specify that the skin-vertex Mp located midway between two rings C1 and C2 of the bicep muscle representation 40 remains un-displaced when the two rings C1 and C2 are translated by a given distance in opposite directions. In the case when the two rings C1 and C2 are translated away from each other by the same given distance, the bicep muscle representation 40 stretches (based on first-motion rules 50 described above in connection with FIG. 1B) and its surface moves in a direction away from the un-displaced skin-vertex Mp, effectively deforming the skin representation 30 away from the bicep muscle representation 40.

However, in the case when the two rings C1 and C2 are translated towards each other by the same given distance, the bicep muscle representation 40 bulges (based on the first-motion rules 50) and its surface moves in a direction closer to the un-displaced skin-vertex Mp, effectively deforming the skin representation 30 closer to the bicep muscle representation 40. In some instances of the latter case, the bicep muscle representation 40, 40' can bulge through the wireframe of skin-vertices 30, 30' thus protruding through the skin representation, 32, 32', as illustrated in FIG. 2B. The systems and techniques disclosed below in connection with FIGS. 3A-3D can adjust positions corresponding to the skin-vertices 32, 32' that apparently have sunken inside the volume of the bicep muscle representation 40, 40', for example, by pushing such recessed skin-vertices 32, 32' to the surface of or outside the volume of the bicep muscle representation 40, 40'. As shown below in FIGS. 4A-4B, pushing the recessed skin-vertices 32, 32' to the surface of the bicep muscle representation 40, 40' corresponds to the skin representation 30 (30') sliding over the flexed (extended) bicep muscle representation 40 (40').

FIG. 3A is a flow chart of an example method 300 for adjusting deformation of a skin representation. In the example described in FIG. 2B, method 300 can be implemented to adjust the skin-vertices 32, 32' that are recessed inside the volume of the bicep muscle 40, 40' of the character 10's arm representation 20. In the example illustrated in FIG. 1B, methods 200 and 300 can be combined and implemented in system 100 for deforming the skin representation 30, 30' in response to motion of the bicep muscle representation 40, 40', and for sliding the skin representation 30, 30' over the bicep muscle representation 40, 40'.

The method 300 includes identifying 310 two rings of the muscle representation adjacent to a displaced skin-vertex. In the example illustrated in FIG. 1B, the identifying 310 is based on the respective geometries of the rings $C_i$, i=0, 1, 2, . . . , of the muscle representation 40. As described below in connection with FIG. 3B, identifying 310 of a section of the muscle representation associated with two rings adjacent to the displaced skin-vertex is independent of a wireframe of muscle-vertices 42 corresponding the muscle representation 40.

Additionally, the method 300 can be applied responsive to determining that a relative position of the displaced skin-vertex with respect to a portion of the muscle representation corresponding to the identified two rings of the muscle representation fails to satisfy a predetermined criterion. Under such circumstances, the method 300 includes adjusting 320 the determined relative position of the skin-vertex with respect to the portion of the muscle representation to satisfy the predetermined criterion. The determination and the adjustment are performed based on the respective geometries of the identified two rings of the muscle representation, as described below in connection with FIGS. 3C-3D.

The predetermined criterion can include maintaining 330 a displaced skin-vertex onto or outside of the muscle representation. In some implementations, maintaining 330 the skin-vertex outside of the muscle representation can include maintaining a skin-vertex outside of a volume of a prism including the identified rings of the muscle representation. In some implementations, maintaining 330 the skin-vertex outside of the muscle representation can include maintaining a predetermined distance from a lateral surface of a prism that includes the identified rings of the muscle representation. Example implementations of maintaining 330 displaced skin-vertices onto or outside of the muscle representation are described below in connection with FIG. 3D.

In some implementations, adjusting 320 the relative position of the displaced skin-vertex determined to be inside the muscle representation can include pushing 340 the displaced skin vertex to a relative position onto (or outside of) the muscle representation, as described below in connection with FIG. 3D. The effect of pushing 340 the displaced skin-vertex from inside to the surface of the muscle simulates sliding of the skin representation over (and in response to motion of) the muscle representation.

Figure 3B:
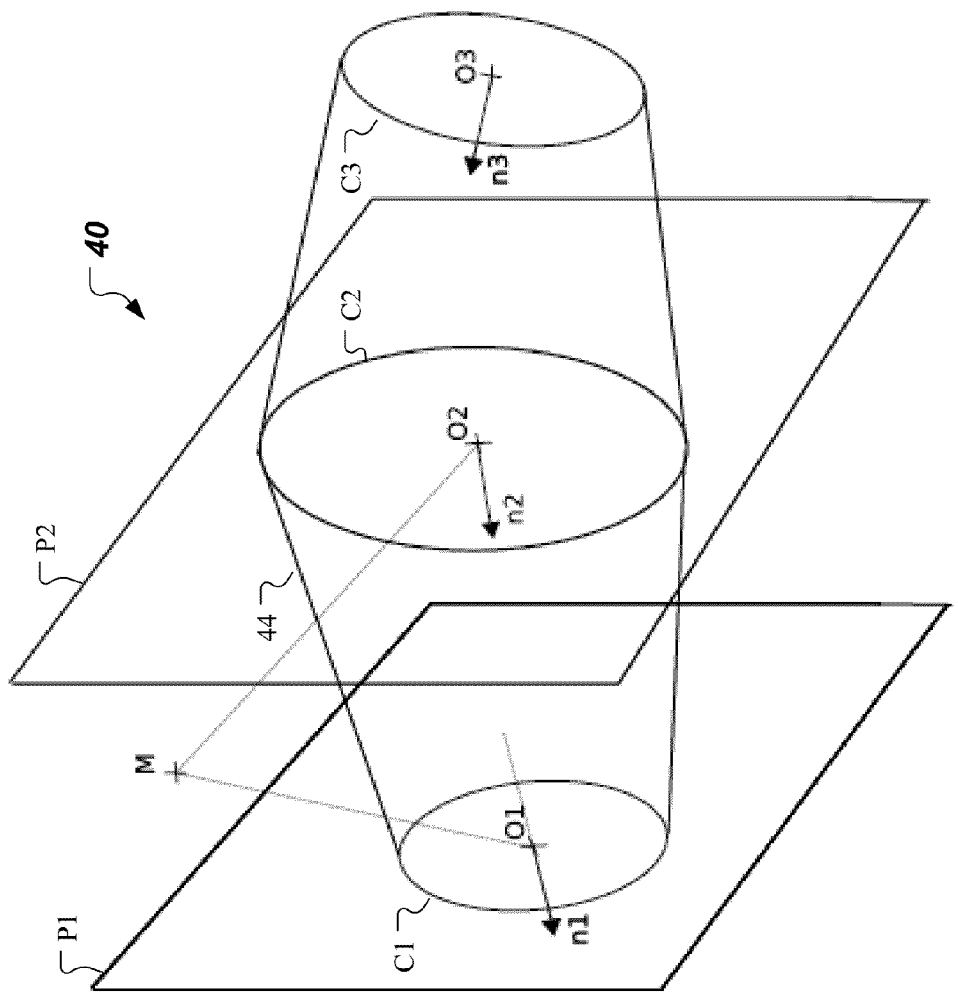

FIG. 3B illustrates a skin-vertex M that is part of a skin representation and that has been displaced near a muscle representation 40, i.e., point M has been moved relative to the muscle representation 40 in response to changes in geometry of the rings C1, C2, C3, . . . , of the muscle representation 40. A section 44 of the muscle representation 40 that is adjacent to the skin-vertex M can be identified 310 based on the following procedure.

The rings C1, C2, . . . , of the muscle representation 40 define respective planes P1, P2, . . . , of the respective rings C1, C2, . . . , and have respective normals n1, n2, . . . , that originate at the respective centers O1, O2, . . . , of the rings C1, C2, . . . ; Two consecutive rings $C_j$ and $C_{j+1}$ are adjacent to the skin-vertex M if the skin-vertex M is between the planes $P_j$ and $P_{j+1}$ defined by the respective adjacent rings $C_j$ and $C_{j+1}$, such that there are no intervening planes (defined by other (non-adjacent) rings) between the skin-vertex M and each of the planes $P_j$ and $P_{j+1}$ defined by the respective adjacent rings $C_j$ and $C_{j+1}$. Equivalently, the skin-vertex M belongs to or is encapsulated within the space between the planes $P_j$ and $P_{j+1}$ defined by the respective adjacent rings $C_j$ and $C_{j+1}$.

A scalar product between a normal $n_1$ and a vector OiM drawn from the displaced skin-vertex M to the center of the ring Ci can be calculated sequentially for the rings C1, C2, . . . ; The consecutive rings $C_j$ and $C_{j+1}$ for which the foregoing scalar product changes sign are being identified 310 as the rings adjacent to the displaced skin-vertex M, e.g., rings C1 and C2. In addition, the identified rings C1 and C2 are bounding the section 44 of the muscle 40 adjacent to the skin-vertex M. A section of the muscle can be identified as adjacent to the a skin-vertex if there are no intervening sections of the muscle between the skin-vertex and the section of the muscle identified as adjacent to the skin-vertex.

Figure 3C:
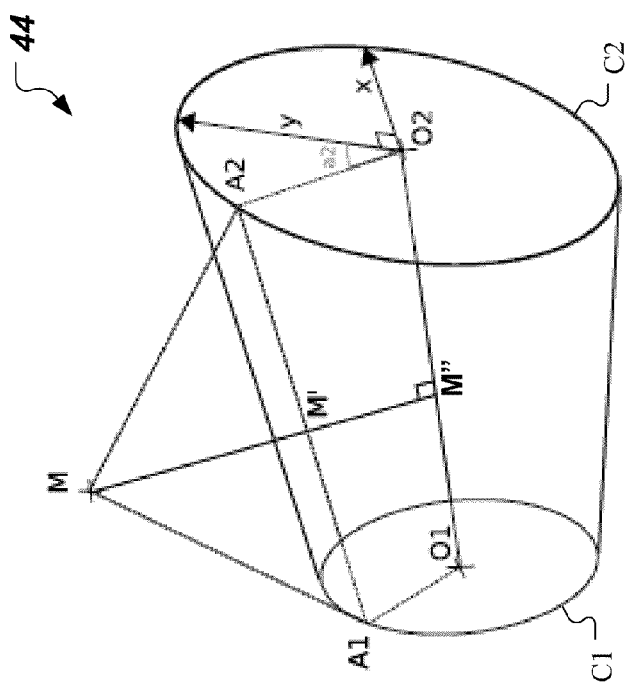

FIG. 3C illustrates a procedure for determining the relative displacement of the skin-vertex M with respect to the section 44 of the muscle representation 40 corresponding to the identified two rings C1 and C2 of the muscle representation 40.

The muscle section 44 can be identified 310 based on a procedure described above in connection with FIG. 3B. The muscle section 44 is bounded by rings C1 and C2 having respective centers O1 and O2.

A plane represented by the points (O1, O2 and M) intersects the rings C1 and C2 at intersection points A1 and A2, respectively. The location of the intersection point A1 can be determined in the following manner. The intersection point A1 belongs to the plane (O1, O2, M) such that a vector O1A1 is orthogonal to a normal "N" of the plane (O1, O2, M). The latter constraint can be expressed algebraically as a null scalar product of the normal N and the vector O1A1:

$$\vec{N} \cdot \vec{O_1 A_1} = 0 \tag{1}$$

The intersection point A1 is also on the ring C1, so the vector O1A1 makes an angle $\alpha 1$ within a Cartesian coordinate system (x1, y1) associated with the ring C1. Accordingly, the vector O1A1 can be expressed in terms of unit-vectors x1 and y1 and the angle $\alpha 1$ as:

$$\vec{O_1 A_1} = \vec{x_1} \cos(\alpha_1) + \vec{y_1} \sin(\alpha_1) \tag{2}$$

The solution of EQs. 1-2 can be determined such that the intersection point A1 is on the same side of the ring C1 as the skin-vertex M. This constraint can be expressed algebraically as a positive scalar product of a vector O1M and the vector O1A1:

$$\vec{O_1 M} \cdot \vec{O_1 A_1} > 0 \tag{3}$$

Accordingly, the solution of EQs. 1-2 in view of the constraint provided by EQ. 3 corresponds to:

$$\tan(\alpha_1) = -\frac{\vec{N} \cdot \vec{x_1}}{\vec{N} \cdot \vec{y_1}}. \tag{4}$$

The scalar product N*x1 in EQ. 4 represents $N_{x1}$, the component of the normal N to the plane (O1, O2, M) projected along the x1-coordinate of the coordinate system (x1, y1) associated with ring C1; and the scalar product N*y1 represents $N_1$, the component of the normal N to the plane (O1, O2, M) projected along the y1-coordinate of the coordinate system (x1, y1) associated with ring C1.

Equations similar to EQs. 1-3 can be solved for the ring C2 to obtain the following solution:

$$\tan(\alpha_2) = -\frac{\vec{N} \cdot \vec{x_2}}{\vec{N} \cdot \vec{y_2}}. \tag{5}$$

The scalar product N*x2 in EQ. 5 represents $N_{x2}$, the component of the normal N to the plane (O1, O2, M) projected along the x2-coordinate of a coordinate system (x2, y2) associated with ring C2; and the scalar product N*y2 represents $N_{y2}$, the component of the normal N to the plane (O1, O2, M) projected along the y2-coordinate of the coordinate system (x2, y2) associated with ring C2.

After determining the intersection points A1 and A2 of the plane (O1, O2, M) with the rings C1 and C2, an intersection point M' can be found of a perpendicular vector dropped from the skin-vertex M to a vector O1O2 with a vector A1A2. The vectors MM' and O1O2 are orthogonal to each other, which can be expressed algebraically as a null scalar product of the vector MM' and the vector O1O2:

$$\vec{MM'} \cdot \vec{O_1O_2} = 0 \qquad (6).$$

By definition, the intersection point M' belongs to vector A1A2, i.e.

$$\vec{A_1M'} = t \cdot \vec{A_1A_2} \qquad (7).$$

The coefficient "t" in EQ. 7 is a real number smaller than 1. EQs. 6-7 can be solved to determine the position of the intersection point M' in terms of the vector MM' and the coefficient "t". The vector A1M can be expressed in terms of vectors O1M and O1A1 as:

$$\vec{A_1M} = \vec{O_1M} - \vec{O_1A_1} \qquad (8).$$

The vector A1M' can be expressed in terms of vectors A1M and MM' as:

$$\vec{A_1M'} = \vec{A_1M} + \vec{MM'} \qquad (9).$$

Further, EQ. 9 can be used to determine the scalar product of vectors A1M' and O1O2 as:

$$\vec{A_1M'} \cdot \vec{O_1O_2} = (\vec{A_1M} + \vec{MM'}) \cdot \vec{O_1O_2} = \vec{A_1M} \cdot \vec{O_1O_2} + \vec{MM'} \cdot \vec{O_1O_2} \qquad (10).$$

EQ. 6 can be used to rewrite EQ. 10 as:

$$\vec{A_1M'} \cdot \vec{O_1O_2} = \vec{A_1M} \cdot \vec{O_1O_2} \qquad (11).$$

Furthermore, EQs. 7 and 11 can be combined to obtain:

$$\vec{A_1M'} \cdot \vec{O_1O_2} = t \cdot \vec{A_1A_2} \cdot \vec{O_1O_2} \qquad (12).$$

Additionally, EQs. 11 and 12 can be combined to determine the coefficient "t" as:

$$t = \frac{\vec{A_1M} \cdot \vec{O_1O_2}}{\vec{A_1A_2} \cdot \vec{O_1O_2}}. \qquad (13)$$

In addition, EQs. 7, 8 and 9 can be combined to determine the vector MM' as:

$$\vec{MM'} = \vec{A_1M'} - \vec{A_1M} \qquad (14)$$
$$= t \cdot \vec{A_1A_2} - \vec{A_1M}$$
$$= t \cdot \vec{A_1A_2} + \vec{O_1A_1} - \vec{O_1M}.$$

The relative position of the skin-vertex M with respect to the muscle section 44 can be determined based on the magnitude and sign of the vector MM' in EQ. 14. The sign of the vector MM' can be determined, for example, by taking the scalar product of either vector O1A1 or O2A2 with the vector MM'. Positive values of the vector MM' correspond to deformations of the skin representation for which the skin-vertex M is displaced outside of the muscle section 44. As illustrated in FIG. 3C, the displaced skin-vertex is located on the opposite side of vector A1A2 with respect to the centers O1 and O2 of the muscle rings C1 and C2. No additional pushing of the displaced skin-vertex M is being applied, in such situations.

Figure 3D:
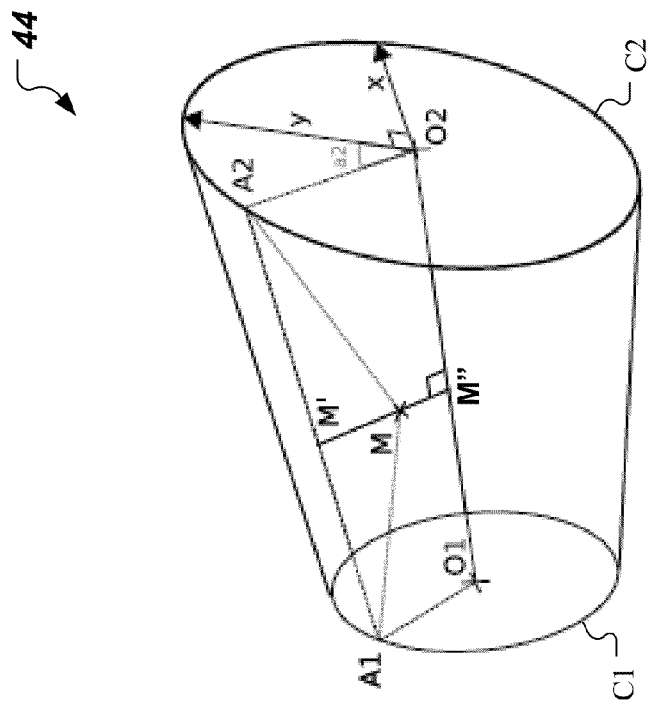

FIG. 3D illustrates an example of a vector MM' having a negative value, i.e., corresponding to deformations of the skin representation for which the skin-vertex M is displaced inside the muscle section 44. In this example, the skin-vertex M is displaced on the same side of vector A1A2 as the centers O1 and O2 of the muscle rings C1 and C2. This situation (depicted for skin-vertices 32, 32' in FIG. 2B) would be in contradiction with a physical and/or anatomical character model that requires for a skin representation to be located on the surface (or outside) of a muscle representation. Accordingly, the skin-vertex M that has been displaced inside the muscle section 44 can be pushed 340 to the surface of the muscle section 44. The amount of pushing 340 that is needed to eliminate the recession of the skin-vertex M can be determined based on the magnitude of the vector MM'. In some implementations, the skin-vertex M displaced to a position inside the muscle section 44 can be pushed to a position on the surface of the muscle section 44 or to a position that is located at a finite (non-zero) distance outside the muscle section 44. The pushing 340 can be based on rules maintained by the system 100 and stored in the storage system 120. Such rules can be referred to as skin-sliding rules.

For example, such skin-sliding rules can augment and/or be part of the second motion rules 60 described above in connection with FIGS. 1B and 2A. In some implementations, a skin-sliding rule can prescribe how far out of the muscle section 44 to push 340 a skin-vertex M located inside the muscle section 44 in accordance with one or more of a location of the muscle section 44 with respect to the muscle representation 40, a type of muscle representation (e.g., bicep muscle, triceps muscle,) and the like. In the example illustrated in FIG. 2B, a first example of skin-sliding rule can specify that a portion 32, 32' of the skin representation 30, 30' recessed inside muscle representations is pushed 340 to the surface of the bicep muscle representation 40, 40', and another portion of the skin representations 30, 30' that is recessed inside the deltoid muscle is pushed 340 above the surface of the muscle representation by a predetermined and finite (non-zero) distance, for instance. In a second example of skin-sliding rule, a portion 32, 32' of the skin located inside a muscle is pushed to the surface of the muscle representation for regions of the muscle away from the muscle joints, and above the surface of the muscle by a predetermined finite (non-zero) distance for regions of the muscle near the muscle joints.

In some implementations, the method 300 of adjusting the skin-vertices displaced in accordance with method 200 can be performed in an interlaced manner. For example, a first skin-vertex is displaced 220 in response to changes in geometry of select muscle rings in accordance with second motion-rules 60. Then, if the displacement of the first skin-vertex corresponds to a recession inside the muscle, the displaced first skin-vertex is pushed 340 to the surface of an identified muscle section. Subsequently, a second skin-vertex is displaced 220 in response to changes in geometry of select muscle rings in accordance with second motion-rules 60. Once again, if the displacement of the second skin-vertex corresponds to a recession inside the muscle, the displaced second skin-vertex is pushed 340 to the surface of an identified muscle section. And so on, and so forth, for other skin-vertices of the skin representation.

In some other implementations, the method 300 of adjusting the skin-vertices displaced in accordance with method 200 can be performed in sequential fashion. For example, skin-vertices of the skin representation can be displaced first in accordance with method 200. Subsequently, method 300 can be implemented to adjust displacements of select skin-vertices of the skin representation determined to be recessed inside the muscle representation.

Other algorithms configured to push a portion of the skin to the surface can be configured to first identify the closest muscle vertices of the muscle representation with respect to a given displaced skin-vertex to determine whether the given skin-vertex is displaced inside or outside a volume of the muscle representation. Computational resources required by such identifying process can be proportional to the complexity of the wireframe of muscle-vertices. In contrast, the method 300 uses the geometry of the muscle rings to determine whether a given displaced skin-vertex is within or outside of the muscle representation. Thus, the computational resources used for this determination can be independent of the complexity of the wireframe of muscle-vertices.

Additionally, some skin relaxation techniques can include identifying skin-vertices that are stretched with respect to their respective neighboring skin-vertices by more than a predetermined distance and pushing the identified skin-vertices to a distance closer to their respective neighbors than the predetermined distance. However, pushing the identified skin-vertices to a distance closer than the predetermined distance relative to their respective neighbors can cause stretching of other skin-vertices farther than the predetermined distance relative to their respective neighbors. Accordingly, multiple iterations are often performed as part of such skin relaxation techniques. In contrast, the method 300 can be implemented as a real-time skin adjustment technique since the skin-sliding effect can be obtained in one step of pushing 340 skin-vertices that are displaced within the muscle to the surface or the muscle.

Figure 4A:
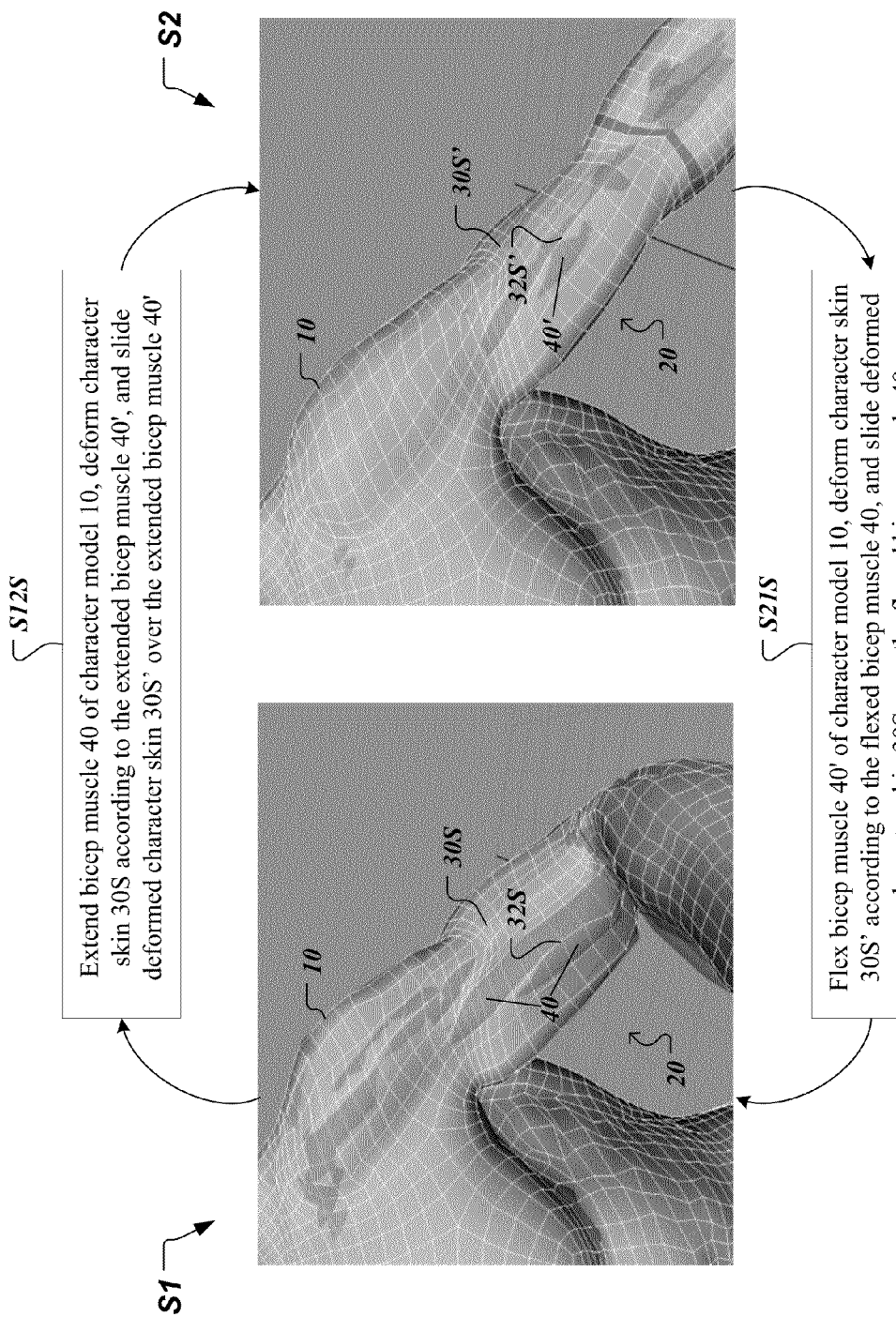
FIGS. 4A-4B show aspects of another procedure for deforming the skin representation of the character model.
Figure 4B:
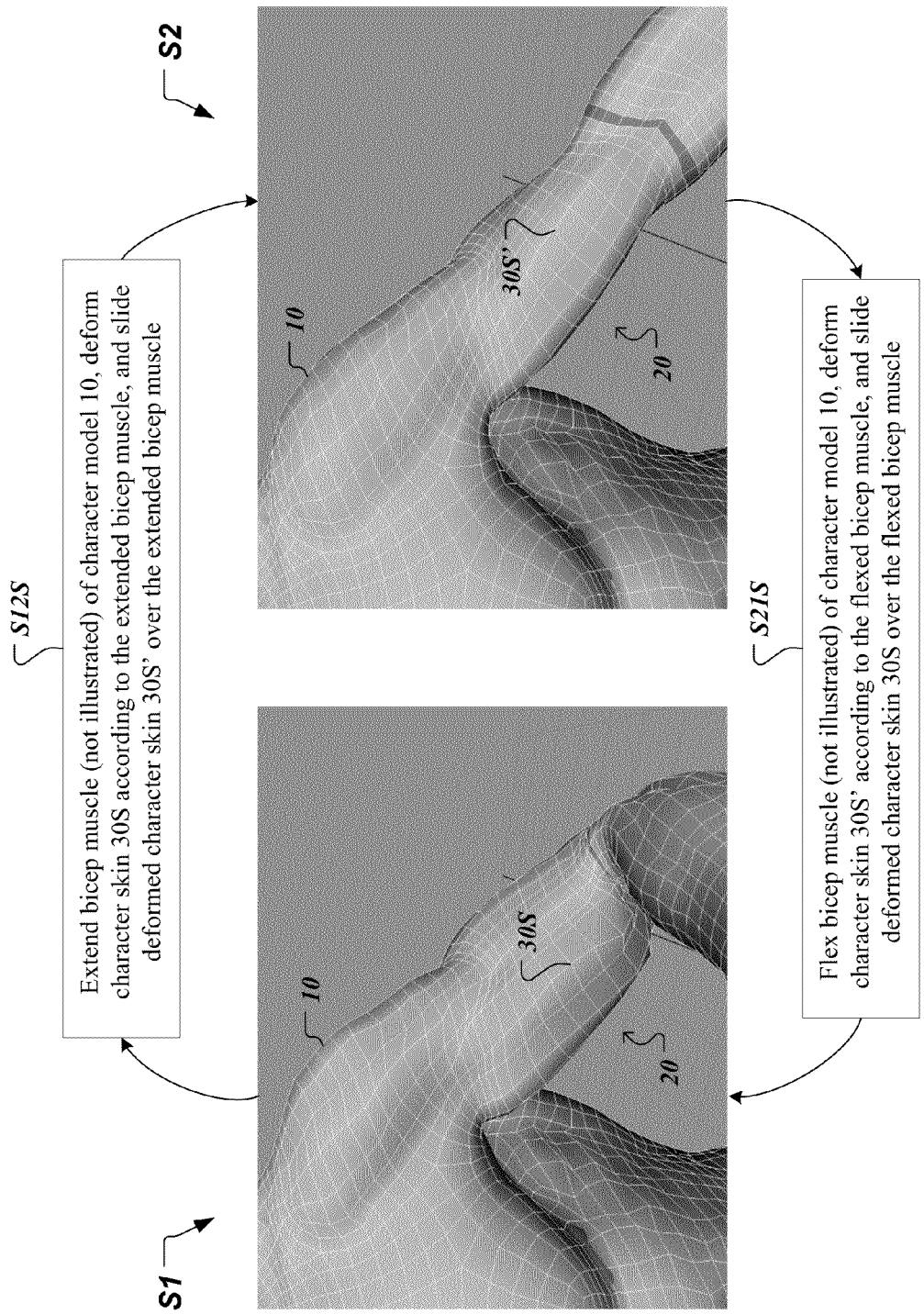

FIGS. 4A-4B show aspects of another procedure for deforming the skin representation of the character model. In some implementations, the procedure illustrated in FIGS. 1A and 2B can be combined with methods 200 and 300 and can be implemented, for example, by the model animator system 130 shown in FIG. 1B.

As described above in connection with FIG. 2B, the character 10's arm representation 20 includes muscles, e.g., the bicep, the triceps, the deltoid, and the like. In FIG. 4A, the representation of the bicep muscle 40, 40' is depicted in grey. Further, the bicep representation 40, 40' is partially covered by the skin representation 30S, 30S'. The skin-representation 30S, 30S' is depicted as a white mesh of skin-vertices on a teal background. In analogy with the description of FIG. 2B, the state S1 of the character 10's arm representation 20 corresponds to a flexed bicep muscle 40. The character 10's arm representation 20 transitions from the state S1 to another state S2 upon extending the bicep muscle 40 from its flexed instance (S12S): In response to the extension of the bicep muscle 40', the skin representation 30S deforms in accordance with method 200 and slides over the extended bicep muscle 40' in accordance with the method 300. The state S2 of the character's arm representation 20 corresponds to an extended bicep muscle 40'. The character 10's arm representation 20 can transition from state the state S2 back into the state S1 upon flexing the bicep muscle 40' from its extended instance (S21S): In response to the flexion of the bicep muscle 40, the skin representation 30S' deforms in accordance with method 200 and slides over the flexed bicep muscle 40 in accordance with the method 300.

The shape of the skin-vertices 30S corresponding to the flexed instance of the bicep muscle 40 in the state S1 can be described as (i) a deformation relative to a shape of the skin-vertices 30* corresponding to a rest (un-deformed) instance of the bicep muscle 40* combined with (ii) sliding of the skin representation 30S over the flexed bicep muscle 40. In addition, the shape of the skin-vertices 30S corresponding to the flexed instance of the bicep muscle 40 in the state S1 can be described as (i) a deformation relative to the shape of the skin-vertices 30S' corresponding to the extended instance of the bicep muscle 40' in the state S2 combined with (ii) sliding of the skin representation 30S over the flexed bicep muscle 40. Similarly, the shape of the skin-vertices 30S' corresponding to the extended instance of the bicep muscle 40' in the state S2 can be described as (i) a deformation relative to a shape of the skin-vertices 30* corresponding to a rest (un-deformed) instance of the bicep muscle 40* combined with (ii) sliding of the skin representation 30S' over the extended bicep muscle 40'. As another example, the shape of the skin-vertices 30S' corresponding to the extended instance of the bicep muscle 40' in the state S2 can be described as (i) a deformation relative to the shape of the skin-vertices 30S corresponding to the flexed instance of the bicep muscle 40 in the state S1 combined with (ii) sliding of the skin representation 30S' over the extended bicep muscle 40'.

Note that while the character 10's arm representation 20 is in the state S1, a portion 32S of the skin representation 30S's skin-vertices that had been displaced in response to flexing of the bicep muscle representation 40 to locations inside the volume of the bicep muscle representation 40 has been subsequently pushed to the surface of the bicep muscle representation 40. Further note that while the character 10's arm representation 20 is in the state S2, a portion 32S' of the skin representation 30S's skin-vertices that had been displaced in response to extending of the bicep muscle representation 40' to locations inside the volume of the bicep muscle representation 40' has been subsequently pushed to the surface of the bicep muscle representation 40'. The portions 32S, 32S' of the skin that are pushed to the surface of the bicep muscle 40, 40' take the shape of the bicep muscle 40, 40', i.e., the skin representation 30S, 30S' appears to slide over the bicep muscle 40, 40'.

Referring back to FIG. 1A, the shape of the skin representation 30, 30' is determined in accordance with the method 200 based on geometry changes of rings of the muscle representation that control deformations of the muscle representation. Note that the shape of the skin representation 30, 30' illustrated in FIG. 1A does not include skin sliding contributions. FIG. 4B, however, shows the shape of the skin representation 30S, 30S' as determined in accordance with (i) the method 200 based on geometry changes of rings of the muscle representation that control deformations of the muscle representation, in combination with (ii) method 300 based on adjustments to portions of the skin representation 30S, 30S' displaced within the muscle representation. Such adjustments, which include pushing portions of the skin representation 30S, 30S' from inside to the surface of the muscle representation, contribute to the effect of skin-sliding over the flexing/extending muscle. As the skin representation 30S, 30S', illustrated in FIG. 4B, slides over the character 10's arm representation 20, the shape of the skin representation 30S, 30S' can follow more closely the detailed shapes of the arm representation 20's underlying muscles, than the skin representation 30, 30', illustrated in FIG. 1A, which does not slide over the character 10's arm representation 20.

Implementations of the subject matter and the operations described in this specification can be configured in digital electronic circuitry, or in computer software, firmware, or hardware, including the structures disclosed in this specification and their structural equivalents, or in combinations of one or more of them. Implementations of the subject matter described in this specification can be configured as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

For example, the techniques and systems disclosed in this specification can be implemented to simulate deformations for determining quickly and interactively whether one or more vertices of a model are penetrating a volume represented by a set of rings that can be translated/rotated/scaled.

What is claimed is:

1. A method comprising:
   deforming, by a data processing apparatus, a skin representation relative to a muscle representation in response to simulated motion of the muscle representation, the skin representation including a plurality of skin-vertices, the simulated muscle representation motion determined by controlling respective geometries of rings of the muscle representation in accordance with first motion-rules;
   for each of a portion of the skin representation skin-vertices, displacing, by the data processing apparatus, the skin-vertex by controlling respective geometries of two or more selected rings of the muscle representation in accordance with second motion-rules;
   identifying, by the data processing apparatus, two rings of the muscle representation adjacent to the displaced skin-vertex, said identifying based on the respective geometries of the rings of the muscle representation, wherein said identifying the two rings of the muscle representation adjacent to the displaced skin-vertex comprises
   for each ring of the muscle representation, calculating a scalar product between a normal to a center of the ring and a vector drawn from the displaced skin-vertex to the center of the ring, and
   selecting two consecutive rings for which the respective scalar products have opposite signs as the two rings of the muscle representation adjacent to the displaced skin-vertex;
   responsive to determining that a relative position of the displaced skin-vertex with respect to a portion of the muscle representation corresponding to the identified two rings of the muscle representation fails to satisfy a predetermined criterion, adjusting, by the data processing apparatus, the determined relative position of the skin-vertex with respect to the portion of the muscle representation to satisfy the predetermined criterion, said determining and said adjusting based on the respective geometries of the identified two rings of the muscle representation; and
   encoding, by the data processing apparatus on non-transitory computer-readable medium, the adjusted relative position of the skin-vertex with respect to the portion of the muscle representation.

2. The method of claim 1, wherein the predetermined criterion comprises:
   maintaining a skin-vertex onto or outside of the muscle representation.

3. The method of claim 2, wherein said maintaining the skin-vertex outside of the muscle representation comprises:
   maintaining a skin-vertex outside of a volume of a prism comprising the identified rings of the muscle representation.

4. The method of claim 2, wherein said maintaining the skin-vertex outside of the muscle representation comprises:
   maintaining a predetermined distance from a lateral surface of a prism comprising the identified rings of the muscle representation.

5. The method of claim 2, wherein said adjusting the relative position of the displaced skin-vertex determined to be inside the muscle representation comprises pushing the displaced skin-vertex to a relative position onto or outside of the muscle representation.

6. The method of claim 1, wherein the geometry of a muscle representation ring comprises location, orientation and scale of the muscle representation ring.

7. The method of claim 1, wherein the muscle representation includes a plurality of muscle-vertices that is independent of the skin representation skin-vertices.

8. The method of claim 7, wherein the first motion-rules comprise rules for moving a vertex of the muscle representation by controlling respective geometries of selected rings of the muscle representation, and rules for selecting the rings of the muscle representation that contribute to moving the vertex of the muscle representation.

9. The method of claim 1, wherein the second motion-rules comprise rules for moving a skin-vertex of the skin representation by controlling respective geometries of the two or more selected rings of the muscle representation, and rules for selecting
   the two or more rings of the muscle representation that contribute to moving the skin-vertex of the skin representation.

10. A method comprising:
    deforming, by a data processing apparatus, a skin representation relative to a muscle representation in response to simulated motion of the muscle representation, the skin representation including a plurality of skin-vertices, the simulated muscle representation motion determined by controlling respective geometries of rings of the muscle representation in accordance with first motion-rules;

for each of a portion of the skin representation skin-vertices, displacing, by the data processing apparatus, the skin-vertex by controlling respective geometries of two or more selected rings of the muscle representation in accordance with second motion-rules;

identifying, by the data processing apparatus, two rings of the muscle representation adjacent to the displaced skin-vertex, said identifying based on the respective geometries of the rings of the muscle representation;

determining, by the data processing apparatus, a relative position of the displaced skin-vertex with respect to a portion of the muscle representation corresponding to the identified two rings of the muscle representation, at least in part, by:

determining a first intersection point of a first plane—defined by the displaced skin-vertex and centers of the identified two rings adjacent to the displaced skin-vertex—with a first ring of the identified two rings adjacent to the displaced skin-vertex, determining a second intersection point of the first plane with a second ring of the identified two rings adjacent to the displaced skin-vertex, determining a projection point of the displaced skin-vertex onto a line including centers of the identified two rings adjacent to the displaced skin-vertex, determining a third intersection point of a line including the displaced skin-vertex and the projection point with a line including the first and second intersection points, determining the relative position of the displaced skin-vertex to be outside of the portion of the muscle representation when the third intersection point is between the displaced skin-vertex and the projection point, determining the relative position of the displaced skin-vertex to be on a lateral surface of the portion of the muscle representation when the third intersection point coincides with the displaced skin-vertex, and determining the relative position of the displaced skin-vertex to be inside the portion of the muscle representation when the displaced skin-vertex is between the third intersection point and the projection point; and responsive to determining that the relative position of the displaced skin-vertex is inside the portion of the muscle representation, adjusting, by the data processing apparatus, the determined relative position of the skin-vertex to be on the lateral surface of the portion of the muscle representation; and encoding, by the data processing apparatus on non-transitory computer-readable medium, the adjusted relative position of the skin-vertex with respect to the portion of the muscle representation.

11. The method of claim 10, wherein the geometry of a muscle representation ring comprises location, orientation and scale of the muscle representation ring.

12. The method of claim 10, wherein the muscle representation includes a plurality of muscle-vertices that is independent of the skin representation skin-vertices.

13. The method of claim 12, wherein the first motion-rules comprise rules for moving a vertex of the muscle representation by controlling respective geometries of selected rings of the muscle representation, and rules for selecting the rings of the muscle representation that contribute to moving the vertex of the muscle representation.

14. The method of claim 10, wherein the second motion-rules comprise rules for moving a skin-vertex of the skin representation by controlling respective geometries of the two or more selected rings of the muscle representation, and rules for selecting the two or more rings of the muscle representation that contribute to moving the skin-vertex of the skin representation.

15. A system comprising:
  a memory device configured to store first motion-rules and second motion-rules;
  one or more hardware processors communicatively coupled with the memory and configured to perform operations comprising:
    deforming a skin representation relative to a muscle representation in response to simulated motion of the muscle representation, the skin representation including a plurality of skin-vertices, the simulated muscle representation motion determined by controlling respective geometries of rings of the muscle representation in accordance with the first motion-rules;
    for each of a portion of the skin representation skin-vertices, displacing the skin-vertex by controlling respective geometries of two or more selected rings of the muscle representation in accordance with the second motion-rules;
    identifying two rings of the muscle representation adjacent to the displaced skin-vertex, said identifying based on the respective geometries of the rings of the muscle representation, wherein the operation of identifying the two rings of the muscle representation adjacent to the displaced skin-vertex comprises
      for each ring of the muscle representation, calculating a scalar product between a normal to a center of the ring and a vector drawn from the displaced skin-vertex to the center of the ring, and
      selecting two consecutive rings for which the respective scalar products have opposite signs as the two rings of the muscle representation adjacent to the displaced skin-vertex; and
    responsive to determining that a relative position of the displaced skin-vertex with respect to a portion of the muscle representation corresponding to the identified two rings of the muscle representation fails to satisfy a predetermined criterion, adjusting the determined relative position of the skin-vertex with respect to the portion of the muscle representation to satisfy the predetermined criterion, said determining and said adjusting based on the respective geometries of the identified two rings of the muscle representation.

16. The system of claim 15, wherein the predetermined criterion comprises a skin-vertex is located onto or outside of the muscle representation.

17. The system of claim 15, wherein the muscle representation includes a plurality of muscle-vertices that is independent of the skin representation skin-vertices.

18. The system of claim 17, wherein the first motion-rules comprise rules for moving a vertex of the muscle representation by controlling respective geometries of selected rings of the muscle representation, and rules for selecting the rings of the muscle representation that contribute to moving the vertex of the muscle representation.

19. The system of claim 15, wherein the second motion-rules comprise rules for moving a skin-vertex of the skin representation by controlling respective geometries of the two or more selected rings of the muscle representation, and rules for selecting the two or more rings of the muscle representation that contribute to moving the skin-vertex of the skin representation.

20. The system of claim 16, wherein the operation of maintaining the skin-vertex outside of the muscle representation comprises maintaining a skin-vertex outside of a volume of a prism comprising the identified rings of the muscle representation.

21. The system of claim 16, wherein the operation of maintaining the skin-vertex outside of the muscle representation comprises maintaining a predetermined distance from a lateral surface of a prism comprising the identified rings of the muscle representation.

22. The system of claim 16, wherein the operation of adjusting the relative position of the displaced skin-vertex determined to be inside the muscle representation comprises pushing the displaced skin-vertex to a relative position onto or outside of the muscle representation.

23. A system comprising:
a memory device configured to store first motion-rules and second motion-rules;
one or more hardware processors communicatively coupled with the memory and configured to perform operations comprising:
deforming a skin representation relative to a muscle representation in response to simulated motion of the muscle representation, the skin representation including a plurality of skin-vertices, the simulated muscle representation motion determined by controlling respective geometries of rings of the muscle representation in accordance with the first motion-rules;
for each of a portion of the skin representation skin-vertices, displacing the skin-vertex by controlling respective geometries of two or more selected rings of the muscle representation in accordance with the second motion-rules;
identifying two rings of the muscle representation adjacent to the displaced skin-vertex, said identifying based on the respective geometries of the rings of the muscle representation;
determining a relative position of the displaced skin-vertex with respect to a portion of the muscle representation corresponding to the identified two rings of the muscle representation, at least in part, by:
determining a first intersection point of a first plane—defined by the displaced skin-vertex and centers of the identified two rings adjacent to the displaced skin-vertex—with a first ring of the identified two rings adjacent to the displaced skin-vertex,
determining a second intersection point of the first plane with a second ring of the identified two rings adjacent to the displaced skin-vertex,
determining a projection point of the displaced skin-vertex onto a line including centers of the identified two rings adjacent to the displaced skin-vertex,
determining a third intersection point of a line including the displaced skin-vertex and the projection point with a line including the first and second intersection points,
determining the relative position of the displaced skin-vertex to be outside of the portion of the muscle representation when the third intersection point is between the displaced skin-vertex and the projection point,
determining the relative position of the displaced skin-vertex to be on a lateral surface of the portion of the muscle representation when the third intersection point coincides with the displaced skin-vertex, and
determining the relative position of the displaced skin-vertex to be inside the portion of the muscle representation when the displaced skin-vertex is between the third intersection point and the projection point; and
responsive to determining that the relative position of the displaced skin-vertex is inside the portion of the muscle representation, adjusting the determined relative position of the skin-vertex to be on the lateral surface of the portion of the muscle representation.

24. The system of claim 23, wherein the geometry of a muscle representation ring comprises location, orientation and scale of the muscle representation ring.

25. The system of claim 23, wherein the muscle representation includes a plurality of muscle-vertices that is independent of the skin representation skin-vertices.

26. The system of claim 25, wherein the first motion-rules comprise rules for moving a vertex of the muscle representation by controlling respective geometries of selected rings of the muscle representation, and rules for selecting the rings of the muscle representation that contribute to moving the vertex of the muscle representation.

27. The system of claim 23, wherein the second motion-rules comprise rules for moving a skin-vertex of the skin representation by controlling respective geometries of the two or more selected rings of the muscle representation, and rules for selecting the two or more rings of the muscle representation that contribute to moving the skin-vertex of the skin representation.

* * * * *